(No Model.) 2 Sheets—Sheet 1.

J. C. HASSEY.
ADJUSTABLE BICYCLE SUPPORT.

No. 508,311. Patented Nov. 7, 1893.

WITNESSES:
H. C. Bauer
G. O. Frink

INVENTOR
James C. Hassey,
BY
Heber S. Paramore.
ATTORNEY.

THE NATIONAL LITHOGRAPHING COMPANY,
WASHINGTON, D. C.

(No Model.) 2 Sheets—Sheet 2.

J. C. HASSEY.
ADJUSTABLE BICYCLE SUPPORT.

No. 508,311. Patented Nov. 7, 1893.

WITNESSES:
H. C. Bauer.
G. O. Frink.

INVENTOR
James C. Hassey.
BY
Heber S. Paramore.
ATTORNEY.

THE NATIONAL LITHOGRAPHING COMPANY,
WASHINGTON, D. C.

UNITED STATES PATENT OFFICE.

JAMES C. HASSEY, OF INDIANAPOLIS, INDIANA.

ADJUSTABLE BICYCLE-SUPPORT.

SPECIFICATION forming part of Letters Patent No. 508,311, dated November 7, 1893.

Application filed February 27, 1893. Serial No. 463,960. (No model.)

*To all whom it may concern:*

Be it known that I, JAMES C. HASSEY, a citizen of the United States, residing at Indianapolis, in the county of Marion and State of Indiana, have invented a new and useful Improvements in Adjustable Bicycle-Supports, of which the following is a specification.

My invention relates to improvements in adjustable bicycle supports of the class that are attached to the bicycle post, and has for its object to produce a bicycle support which shall be adjustable to any inequalities of the ground and which can be operated by the rider without dismounting. I attain these objects by means of the mechanism illustrated in the accompanying drawings, in which—

Figure 2:
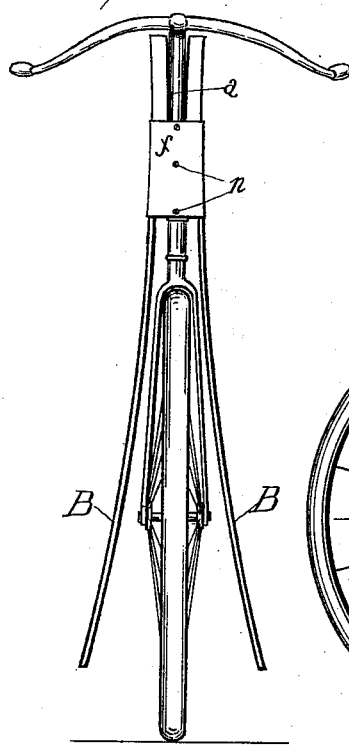
Figure 1:
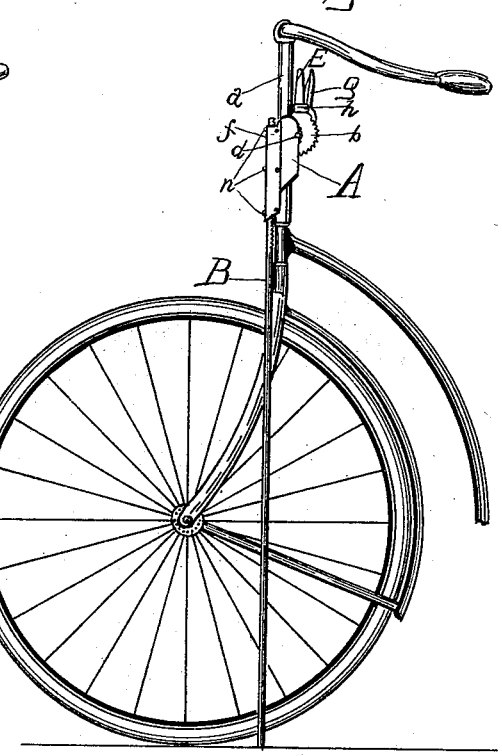
Figure 3:
Figures 4, 5:
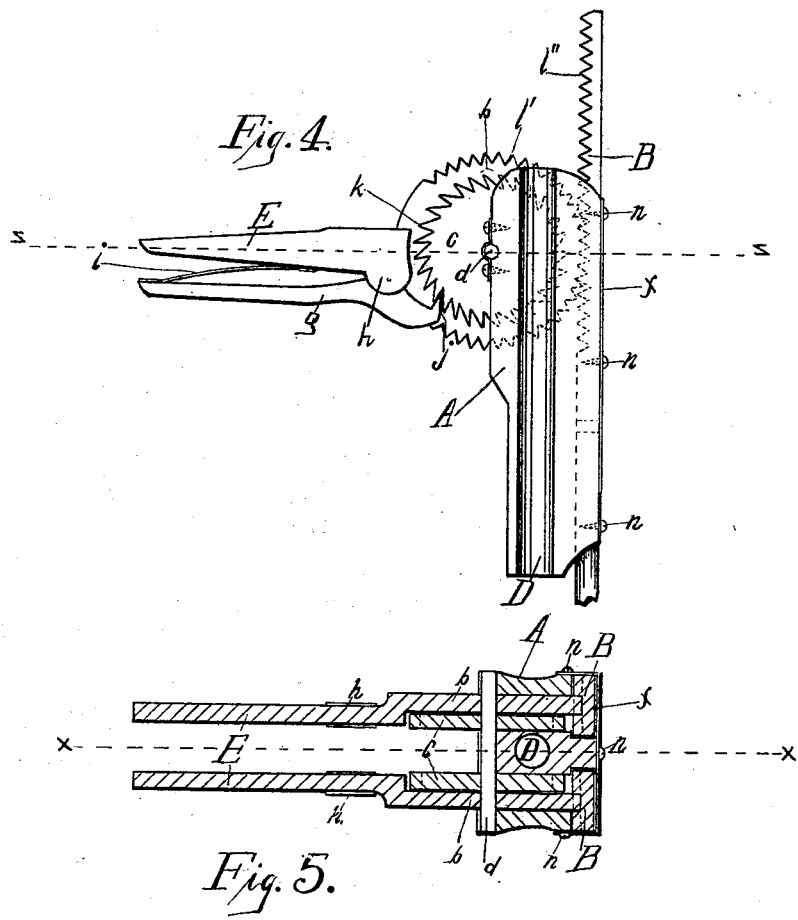

Figure 1 is a side view of a portion of a bicycle with my supporting device thereon, as it appears when supporting a bicycle. Fig. 2 is a front view showing the supports raised as they appear when the bicycle is in motion. Fig. 3 shows the curved adjustable supporting leg or prop. Fig. 4 is a vertical sectional view of the device taken on the line $x$ $x$ of Fig. 5. Fig. 5 is a horizontal sectional view of the device taken on the line $z$ $z$ of Fig. 4.

Like letters of reference indicate corresponding parts in all the figures of the drawings.

A designates the body of the device which fits over the bicycle post $a$, and carries the supporting legs B, and to which the cogged disks $b$, and the ratchet wheels $c$, are journaled on the journal $d$.

To the body A, is attached by means of the screws $n$, the plate $f$, which has slightly curved sides, being narrower at the top and wider at the bottom, as best seen in Fig. 2. It will be seen that the plate $f$, forms guideways in which the supporting legs B, slide, and are held firmly in contact with the cogged disks $b$, by means of which they are raised and lowered.

D designates the opening running through the length of the body A, in which the post $a$, is fitted.

E is a short lever made fast to the cogged disks $b$, and to which is attached the spring pressed pawl $g$, by means of the lugs $h$. The spring $i$, presses the point $j$, of the pawl $g$, in contact with the teeth $k$, of the ratchet-wheel $c$. The ratchet-wheel $c$, being immovably fastened on the journal $d$, the cogged disk $b$ is held firmly in any desired position.

The supporting legs B are curved as shown in Fig. 3. The plate $f$, also being curved to conform with the curve of the leg B, forms a curved guideway in which the leg B slides without binding, and it will be seen that by raising the leg B the curved guideway will cause the lower end thereof to draw nearer together and closer to the wheel, and when they are lowered as in Fig. 1, the lower ends will spread apart, thus more securely bracing the wheel in an upright position.

When in practical use the rider of the bicycle grasps the lever E and presses the pawl $g$, out of contact with the teeth of the ratchet-wheel $c$, when the lever can be pushed down, thus causing the cogs $l'$ of the disk $b$, which mesh with the cogs $l''$ on the widened end of the leg B, to raise the leg B, to its highest point.

To lower the supports it is only necessary to grasp the lever E, pressing the pawl $g$, as before, and raise the lever until the lower extremities of the legs B come in contact with the ground. The levers E, working independently of each other it is obvious that the legs B can be lowered independently of each other to any desired distance and thus conform with any inequalities of the ground and hold the bicycle in a perfectly perpendicular position.

What I claim, and desire to secure by Letters Patent, is—

1. The combination, in a bicycle support, of the curved legs B having the cogs $l''$ on their widened ends, each being adjustable independently of the other with the cogged disks $b$, having the levers E, the spring pressed pawls $g$, the ratchet-wheels $c$, having the teeth $k$, all substantially as set forth.

2. In an adjustable bicycle support, the combination with the body portion A, having the opening D, and provided with the journal $d$, and the plate $f$, of the shape specified, attached thereto, of the legs B, the cogged disks $b$, the ratchet-wheels $c$, the levers E, and the spring pressed pawls $g$, all substantially as and for the purpose set forth.

JAMES C. HASSEY.

Witnesses:
GEO. A. TOPP,
H. C. BAUER.